United States Patent
Mons et al.

(10) Patent No.: US 7,553,130 B1
(45) Date of Patent: *Jun. 30, 2009

(54) NOZZLE RING ADHESIVE BONDED BLADING FOR AIRCRAFT ENGINE COMPRESSOR

(75) Inventors: Claude Marcel Mons, Savigny le Temple (FR); Sandra Andrieu, Roissy-en-Brie (FR); Manuel Girard, Vaux le Penil (FR); Francois Pierre Georges Maurice Ribassin, Villabe (FR)

(73) Assignee: Snecma, Paris (FR)

( * ) Notice: Subject to any disclaimer, the term of this patent is extended or adjusted under 35 U.S.C. 154(b) by 59 days.

This patent is subject to a terminal disclaimer.

(21) Appl. No.: 11/523,522

(22) Filed: Sep. 20, 2006

Related U.S. Application Data

(63) Continuation of application No. 10/876,610, filed on Jun. 28, 2004, now Pat. No. 7,147,434.

(30) Foreign Application Priority Data

Jun. 30, 2003 (FR) .................................. 03 07898

(51) Int. Cl.
*F01D 9/04* (2006.01)
(52) U.S. Cl. ................. 415/200; 415/209.4; 415/210.1; 29/458; 29/889.22
(58) Field of Classification Search ... 415/209.2–209.4, 415/210.1, 189, 190, 200; 29/458, 889.21, 29/889.22; 156/307.1, 307.7
See application file for complete search history.

(56) References Cited

U.S. PATENT DOCUMENTS

| | | | |
|---|---|---|---|
| 3,268,207 A | 8/1966 | Bill | |
| 3,339,833 A | 9/1967 | Bill et al. | |
| 3,393,436 A | 7/1968 | Blackhurst et al. | |
| 3,708,242 A | 1/1973 | Bruneau et al. | |
| 4,452,564 A | 6/1984 | Conant et al. | |
| 4,832,568 A | 5/1989 | Roth et al. | |
| 5,022,818 A | 6/1991 | Scalzo | |
| 5,083,900 A | 1/1992 | Carletti et al. | |
| 5,226,789 A | 7/1993 | Donges | |
| 5,560,841 A | 10/1996 | DeMichael et al. | |
| 5,732,468 A | 3/1998 | Galley et al. | |
| 6,119,339 A | 9/2000 | Richter et al. | |
| 6,431,830 B1 | 8/2002 | Richter et al. | |
| 6,494,677 B1 | 12/2002 | Grady | |
| 6,619,917 B2 | 9/2003 | Glover et al. | |
| 6,648,597 B1 | 11/2003 | Widrig et al. | |
| 7,147,434 B2 * | 12/2006 | Mons et al. ................. 415/200 |

* cited by examiner

*Primary Examiner*—Christopher Verdier
(74) *Attorney, Agent, or Firm*—Oblon, Spivak, McClelland, Maier & Neustadt, P.C.

(57) ABSTRACT

A compressor nozzle ring for an aircraft includes an inner shroud, an outer shroud and a multiplicity of blades extending from the inner shroud to the outer shroud. Each blade passes through the inner shroud and is attached to it with sealing cement containing an organic polymer adhesive. The adhesive is polyimide based.

19 Claims, 2 Drawing Sheets

NOZZLE RING ADHESIVE BONDED BLADING FOR AIRCRAFT ENGINE COMPRESSOR

BACKGROUND OF THE INVENTION

I. Field of the Invention

The invention relates to a compressor nozzle ring for an aircraft engine including an inner shroud, an outer shroud, and a multiplicity of blades arranged circumferentially and extending radially from the inner shroud to the outer shroud, each blade passing through a corresponding aperture formed in the inner shroud and being attached to the inner shroud by means of a sealing cement containing an organic polymer adhesive.

II. Description of Related Art

Three techniques are currently employed to fix the blades of a nozzle ring to the inner shroud, i.e. mechanical assembly by bolting or riveting, high-temperature soldering using filler metals, and bonding by means of filled silicone elastomers.

By way of example, U.S. Pat. No. 6,431,830 describes a nozzle ring wherein the blades are attached to the inner shroud by high-temperature soldering.

Mechanical solutions are disadvantageous by reason of their high production cost as well as their complexity and weight.

The high-temperature soldering solution is not always applicable depending on the constituent materials of the blades and the shroud. In particular, when these components are made of titanium, high-temperature soldering must be carried out at very high temperatures resulting in prohibitive deformation.

The solution using silicone elastomer is effective, but the service life of these elastomers diminishes when the operating temperature of the compressor increases. Thus, for new generation compressors operating continuously at temperatures in the region of 300° C. in an atmosphere containing oil mist, silicone elastomer based adhesives suffer embrittlement which limits the practical service life to 100 hours.

BRIEF SUMMARY OF THE INVENTION

The object of the invention is to overcome the aforementioned drawbacks of the known fixing methods.

In particular, it is desired to obtain bonded joints that are workable for 1000 hours at temperatures in the region of 300° C.

The invention relates in particular to a nozzle ring of the type described in the introduction, and provides that the adhesive is polyimide-based.

Polyimide-based adhesives provide long-term resistance to the atmospheres obtaining in the compressors of aircraft engines, and it is possible to choose such an adhesive in relation to the specified operating temperature, certain such adhesives being capable of withstanding temperatures in the order of 300° C.

Optional features of the invention, whether complementary or alternative in character, are described below:

The inner shroud and/or the blades are made of titanium.

End regions of the blades project radially inward beyond the inner shroud.

An insert disposed inside the inner shroud and in proximity to the inner shroud delineates in conjunction with the inner shroud and the blades a space that is filled with said cement.

Said insert takes the form of a flexible sheet.

At the ends of the blades, the flexible sheet forms pockets extending radially away from the inner shroud.

The flexible sheet is formed from several elements connected together in the circumferential direction of the inner shroud with partial overlap.

The flexible sheet is a glass or carbon fibre fabric impregnated with polyimide.

Said insert takes the form of a multiplicity of rigid parts.

Each of said rigid parts is interposed between projecting regions of two consecutive blades.

Each of said rigid parts is force-fitted between said projecting regions.

Each of said rigid parts extends on a length of arc greater than the circumferential pitch of the blades.

Said rigid parts present apertures to receive the projecting regions of the blades.

Said rigid parts are fixed to the inner shroud by means of said cement.

Said rigid parts are made of aluminium alloy or magnesium alloy.

Said cement is in film form.

Said cement is in the form of foam.

Said polyimide-based adhesive is capable of withstanding a temperature of approximately 300° C. without deterioration during operation of the nozzle ring.

The blades are fixed to the outer shroud by electron beam welding.

BRIEF DESCRIPTION OF THE DRAWINGS

The characteristics and advantages of the invention are set forth in greater detail in the description below with reference to the attached figures.

DETAILED DESCRIPTION OF THE INVENTION

Figure 1:
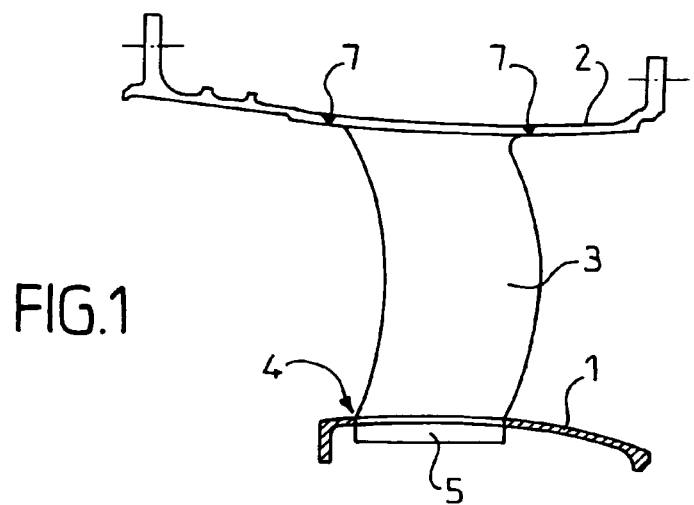
FIG. 1 is a partial axial half-section of a compressor stage to which the invention applies, showing an inner shroud, an outer shroud, and a blade fixed thereto.
Figures 2, 3:
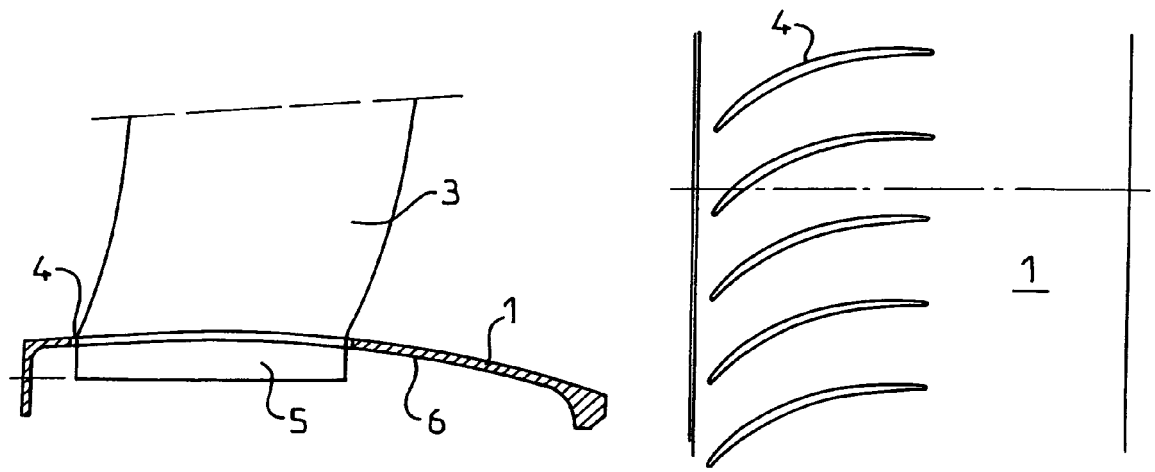
FIG. 2 is an enlarged part of FIG. 1 showing the inner shroud and the blade regions adjacent thereto.
FIG. 3 is a partial view of the inside face of the inner shroud developed in an imaginary flat plane.

In a conventional manner, the compressor stage shown in FIGS. 1 to 3 includes an inner shroud 1 and an outer shroud 2, both fixed, and a series of guide blades 3 extending in a general radial direction from the inner shroud to the outer shroud. The blades 3 are arranged in the circumferential direction in a generally uniform manner. The inner shroud 1 is pierced by apertures 4 of which the shape matches the profile of the blades. Each of the apertures is traversed by a blade 3 of which an end region 5 projects towards the engine axis beyond the aperture 4 and therefore beyond the inside face 6 of the shroud 1. The blades 3 are fixed to the outer shroud 2, for example, by means of welds 7 made by electron beam welding.

The way the blades are attached to the inner shroud 1, according to the invention, is described below.

Figure 4:
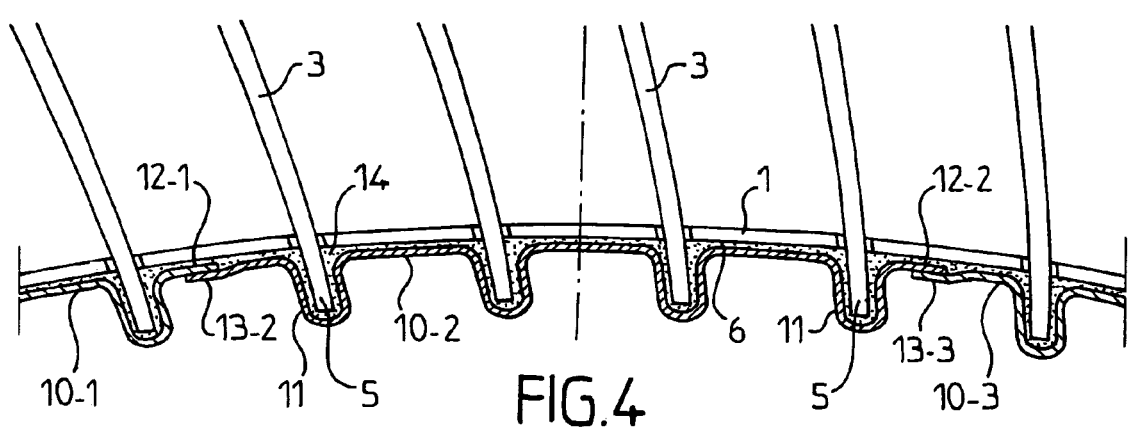
FIG. 4 is a partial cross-sectional view in a plane perpendicular to the engine axis, showing part of the inner shroud and the root areas of the corresponding blades attached to the inner shroud according to a first embodiment of the invention.

In FIG. 4, the inside face 6 of the inner shroud 1 and the projecting regions 5 of the blades 3 are covered by a flexible sheet formed from several pieces of fabric 10-1, 10-2, 10-3, which are connected together and partially overlap in the circumferential direction. The flexible sheet follows the internal outline defined by the face 6 and by the regions 5, and therefore extends away from the shroud 1 to form pockets 11 wherein the regions 5 are seated. In the example illustrated, the piece of fabric 10-2 covers the end regions 5 of four blades 3, one of its marginal regions, referenced 12-2, being covered by a marginal region 13-3 of piece 10-3, while its opposite marginal region 13-2 covers a marginal region 12-1 of piece 10-1. Each of the aforementioned marginal regions is located between two adjacent blades. In conjunction with the shroud 1 and the blades 3, the flexible sheet delineates an annular space 14 which is filled by a film of a polyimide-based adhesive such as that marketed by the company Cytec Fiberite Inc., product reference FM 680, this adhesive also filling the gaps between the blades 3 and the periphery of the aperture 4. The flexible sheet 10-1, 10-2, 10-3 is advantageously formed from a glass or carbon fibre fabric impregnated with polyimide.

To make the attachment illustrated in FIG. 4, after fitting the blades, the projecting regions 5 of the blades and the internal surface 6 of the shroud 1 are coated with adhesive foam, following which the flexible sheet is applied and the assembly is treated at a temperature in the order of 180° C. to cure the adhesive, applying light pressure to facilitate its adhesion to the parts being assembled.

Figure 5:
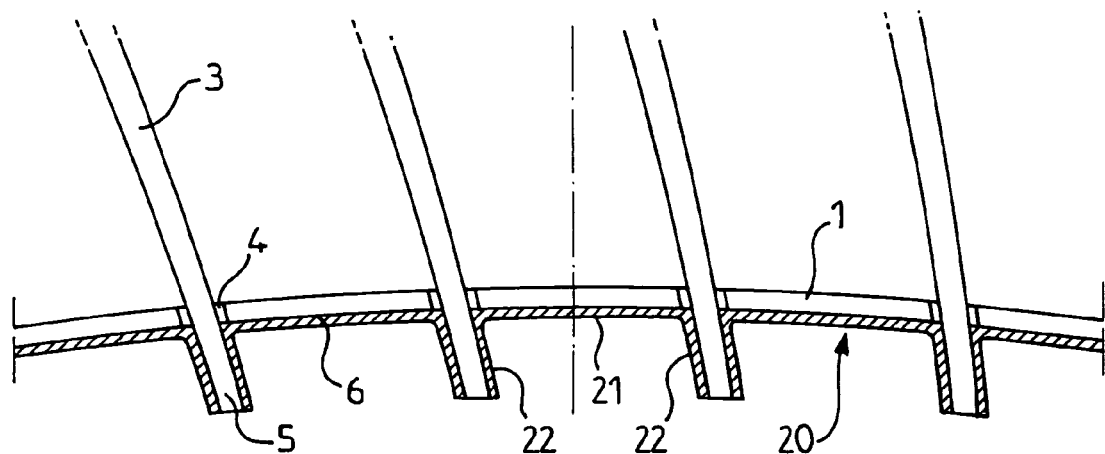
FIG. 5 is a view similar to FIG. 4 relating to a second embodiment of the invention.

In the embodiment in FIG. 5, the volume allocated for the adhesive composition is delineated towards the inside of the shroud 1 by a multiplicity of parts 20 made of aluminum alloy or magnesium alloy, each of which is interposed between two adjacent blades 3. Each part 20 presents, in the plane of the Figure, an angled U profile of which the base 21 is applied against the inside face 6 of the shroud 1 and of which the legs 22 are respectively applied against the two adjacent blades. A thin film of a polyimide-based adhesive such as that marked by the company Cytec Fiberite Inc., product reference FM 680, is interposed between the parts 20 on the one hand, the shroud 1 and the end regions 5 of the blades on the other hand, the adhesive also filling the gaps between the blades and the periphery of the aperture 4. It is also possible in this instance to use a polyimide foam such as that marketed by the company Cytec Fiberite Inc., product reference FM 680-2.

The attachment in FIG. 5 can be made in the following manner. The inside face 6 of the shroud and the regions 5 of the blades are coated with a thin film of adhesive and the parts 20 are then inserted, these being sized so that they are held in place by force fit before the adhesive hardens, which is accomplished as in the previous example by means of heat treatment.

Figure 6:
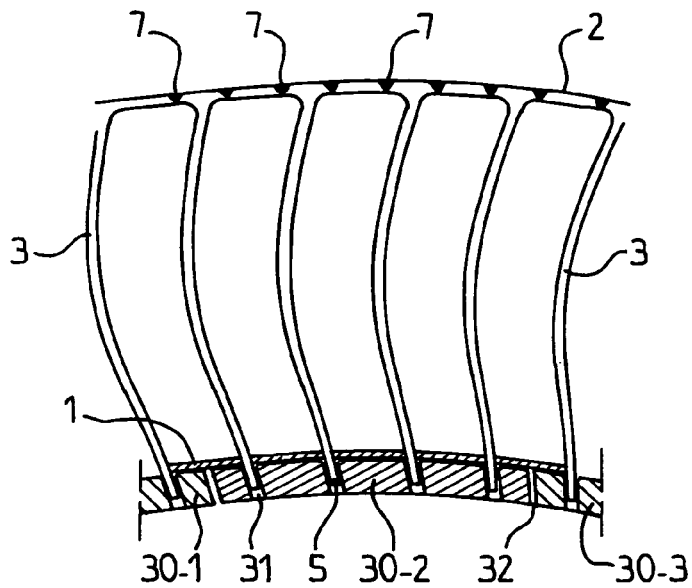
FIG. 6 is a view similar to FIGS. 4 and 5 relating to a third embodiment of the invention and showing in addition the full length of the blades and part of the outer shroud.
Figure 7:
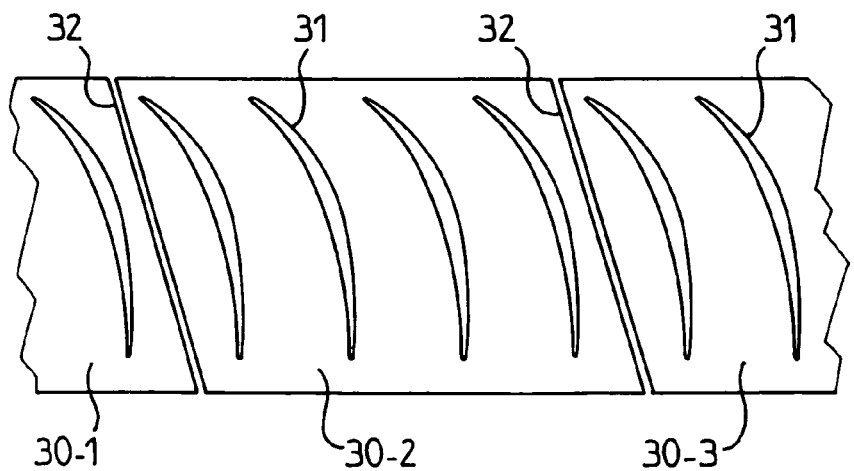
FIG. 7 is a partial view of the inside face of the insert in FIG. 6, developed in an imaginary flat plane.

The method of attachment in FIGS. 6 and 7 differs from that in FIG. 5 in that the hollow parts 20 are replaced by solid parts 30-1, 30-2, 30-3 made of a polyimide foam such as that marketed by the company Dupont de Nemours, product reference SF-0920, having a relative density of 0.3, each of which extends over a length of arc that is a multiple of the circumferential pitch of the blades, and is traversed by apertures 31 to accommodate the projecting regions 5 of the blades. Two adjacent parts are separated by a narrow gap 32 located between two adjacent blades. Assembly is carried out in the same manner as in FIG. 5, and the apertures 31 can be sized so as to enable the parts 30-1, 30-2, 30-3 to be held in place by friction on the regions 5 of the blades.

The invention claimed is:

1. A compressor nozzle ring for an aircraft engine, said nozzle ring comprising:
   an inner shroud;
   an outer shroud; and
   a multiplicity of blades arranged circumferentially and extending radially from the inner shroud to the outer shroud, each of the blades passing through a corresponding aperture formed in the inner shroud and being attached to the inner shroud with sealing cement containing an organic polymer adhesive,
   wherein said adhesive is polyimide based;
   wherein end regions of the blades project radially inward beyond the inner shroud;
   wherein an insert disposed inside the inner shroud and in proximity to the inner shroud surrounds, in conjunction with the inner shroud and the blades, a continuous space along the inside of the inner shroud that is filled with said cement, and the continuous space filled with the cement continues without a gap between adjacent blades of the blades and around the end regions of the adjacent blades; and
   wherein said insert surrounds the end regions of the adjacent blades including a radially innermost area of the adjacent blades.

2. The nozzle ring according to claim 1, wherein the inner shroud and/or the blades are made of titanium.

3. The nozzle ring according to claim 1, wherein said insert is a flexible sheet.

4. The nozzle ring according to claim 3, wherein the flexible sheet forms pockets at the end regions of the adjacent blades, said pockets extending radially away from the inner shroud.

5. The nozzle ring according to claim 4, wherein the flexible sheet is formed from several elements connected together in the circumferential direction of the inner shroud with partial overlap.

6. The nozzle ring according to claim 4, wherein the flexible sheet is a glass fibre or carbon fibre fabric impregnated with polyimide.

7. A compressor nozzle ring for an aircraft engine, comprising:
   an inner shroud;
   an outer shroud; and
   a multiplicity of blades arranged circumferentially and extending radially from the inner shroud to the outer shroud, each of the blades passing through a corresponding aperture formed in the inner shroud and being attached to the inner shroud with sealing cement containing an organic polymer adhesive,
   wherein said adhesive is polyimide based;
   wherein end regions of the blades project radially inward beyond the inner shroud;
   wherein an insert disposed inside the inner shroud and in proximity to the inner shroud surrounds, in conjunction with the inner shroud and the blades, a space that is filled with said cement, and the space filled with the cement continues without a gap between adjacent blades of the blades;
   wherein said insert includes a multiplicity of rigid parts; and
   wherein each of said rigid parts is interposed between the end regions of the adjacent blades such that each individual part of said rigid parts covers a side of the end regions of each of the adjacent blades to surround the space that is filled with cement.

8. The nozzle ring according to claim 7, wherein each of said rigid parts is force fitted between said end regions.

9. The nozzle ring according to claim 7, wherein each of said rigid parts extends over a length of arc greater than a circumferential pitch of the adjacent blades.

10. The nozzle ring according to claim 9, wherein said rigid parts have apertures to receive the end regions of the adjacent blades.

11. The nozzle ring according to claim 7, wherein said rigid parts are fixed to the inner shroud by said cement.

12. The nozzle ring according to claim 7, wherein said rigid parts are made of aluminum alloy or magnesium alloy.

13. The nozzle ring according to claim 1, wherein said cement is in film form.

14. The nozzle ring according to claim 1, wherein said cement is in foam form.

15. The nozzle ring according to claim 1, wherein said polyimide-based adhesive is capable of withstanding a temperature of approximately 300° C. without deterioration during operation of the nozzle ring.

16. The nozzle ring according to claim 1, wherein the blades are attached to the outer shroud by electron beam welding.

17. The nozzle ring according to claim 7, wherein said insert has an angled U profile.

18. The nozzle ring according to claim 7, wherein said insert is a non-hollow solid insert.

19. The nozzle ring according to claim 1, wherein the insert includes a plurality of insert pieces and each of the plurality of insert pieces surrounds the end regions including the radially innermost area of a plurality of the blades.

* * * * *